(12) United States Patent
Phillips (10) Patent No.: US 8,322,574 B1
(45) Date of Patent: Dec. 4, 2012

(54) DRINKING WATER DISPENSING SYSTEM FOR AUTOMOBILES AND ASSOCIATED METHOD

(76) Inventor: Larry K. Phillips, Houston, TX (US)

( * ) Notice: Subject to any disclaimer, the term of this patent is extended or adjusted under 35 U.S.C. 154(b) by 542 days.

(21) Appl. No.: 12/533,723

(22) Filed: Jul. 31, 2009

Related U.S. Application Data (60) Provisional application No. 61/137,699, filed on Aug. 1, 2008.

(51) Int. Cl.
*B60N 3/10* (2006.01)
*B60K 37/00* (2006.01)

(52) U.S. Cl. ....... 222/146.1; 222/74; 222/608; 222/626; 392/468; 62/243; 165/42; 219/202

(58) Field of Classification Search .......... 222/74, 222/75, 146.1, 626, 146.2, 146.5, 146.6, 222/608, 610, 628; 392/648; 62/239, 243; 219/202; 165/41–43
See application file for complete search history.

(56) References Cited

U.S. PATENT DOCUMENTS

| | | | |
|---|---|---|---|
| 2,921,714 A * | 1/1960 | Richeson | 222/67 |
| 3,224,641 A * | 12/1965 | Morgan | 222/129.1 |
| 3,558,013 A * | 1/1971 | Ponzo et al. | 222/61 |
| 3,642,023 A | 2/1972 | Rembert | |
| 4,140,150 A | 2/1979 | Rundell | |
| 5,287,913 A * | 2/1994 | Dunning et al. | 165/243 |
| 6,076,706 A | 6/2000 | Kritchman | |
| 7,108,094 B2 * | 9/2006 | Daniels | 180/90 |
| 7,190,892 B2 * | 3/2007 | Kertesz | 392/480 |
| 2009/0057340 A1 * | 3/2009 | Moothart | 222/113 |

* cited by examiner

Primary Examiner — J. Casimer Jacyna (57) ABSTRACT

A drinking water dispensing system for automobiles and associated method preferable includes a reservoir; an egress spout, a pump; temperature adjusting mechanism; a user interface; a thermodynamic conduit including first and second valves; cooling elements; heating elements and first and second insulating layers. The first and second passageways are coaxially oriented along the conduit and cooperate with the cooling/heating elements such that cold/hot water streams are independently transferred to the egress spout while maximizing/minimizing heat transfer losses. Separate water streams are passed through the first/second passageways by selectively toggling the first/second plurality of valves between open and closed positions upon receiving instructions signals from the user interface. Such a system provides users with a readily available source of hot/cold water for drinking while traveling, without requiring the use of separate water-transfer conduits.

13 Claims, 6 Drawing Sheets

DRINKING WATER DISPENSING SYSTEM FOR AUTOMOBILES AND ASSOCIATED METHOD

CROSS REFERENCE TO RELATED APPLICATIONS

This application claims the benefit of U.S. Provisional Application No. 61/137,699, filed Aug. 1, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to liquid dispensing systems and, more particularly, to a drinking water dispensing system for automobiles and the like for providing users with a readily available source of water for drinking while traveling.

2. Prior Art

The advantages of having drinking water in an automobile are readily apparent. Individuals may carry water for nourishment, refreshment, to assist in swallowing medicines, or be stored in case of an emergency. Water is especially important in southern climates, where automobile temperatures are elevated by intense sunlight. Air conditioning does not eliminate the need for people to maintain liquid in their bodies and long distance travelers, such as truck drivers, remain subject to dehydration if water loss is not replenished.

Many different products are marketed for maintaining chilled water or sodas during automobile travels. For instance, insulated ice chests are available for placement within the seating area of an automobile for ease of access. However, even ergonomic style devices take up valuable seating area and pose potential safety risks. For example, when a cooler is placed in the back seat of a vehicle a driver must reach over the vehicle front seat, lessening automobile control. Additionally, if the automobile is involved in an accident, a cooler can become a dangerous projectile that may injure occupants inside the automobile. Despite the hazards involved, many individuals keep coolers and ice chests in automobiles since chilled water is a necessity for numerous occasions.

Additionally, it is cumbersome to employ two separate conduits to transfer hot and cold water, respectively. Such conduits are difficult to pass through the vehicle's space-limited areas. The need for two egress spouts is also inconvenient.

Accordingly, a need remains for a drinking water dispensing system for automobiles and the like in order to overcome the above-noted shortcomings. The present invention satisfies such a need by providing a system that is convenient and easy to use, is durable in design, is versatile in its applications, and eliminates the need to make continuous interruptions to trips by stopping at stores just to slake a thirst. The present invention offers much needed hydration during road crises such as breakdowns and traffic jams. With the system filled to capacity, motorists never need worry that they will be stuck without water to drink. In addition, the practical automobile system proves a handy and convenient solution should the car overheat while on the road.

BRIEF SUMMARY OF THE INVENTION

In view of the foregoing background, it is therefore an object of the present invention to provide an apparatus for an automobile water dispensing system for providing users with a readily available source of drinking water while traveling. These and other objects, features, and advantages of the invention are provided by a drinking water dispensing system for automobiles and associated method.

In a preferred embodiment of the present invention, an automobile water dispensing system may preferably include a reservoir adapted to house a predetermined quantity of water. The reservoir may preferably be adapted to be placed within a trunk of the automobile. A thermodynamic conduit may further be directly connected to the reservoir such that the conduit is adapted to be directed to a passenger section of the automobile.

In one embodiment, an egress spout in fluid communication with the conduit may preferably be adapted to be located underneath a dashboard of the automobile. A pump coupled to the reservoir may preferably be coupled to maintain a minimum pressure level such that water may freely flow through the conduit and exit from the egress spout upon receiving a user input at the egress spout. A conduit temperature adjusting mechanism may preferably be included for selectively adjusting a temperature of the conduit such that a corresponding water temperature is adjusted during downstream travel from the reservoir to the egress spout. In addition, the conduit temperature adjusting mechanism may preferably be disposed exterior of the reservoir and embedded within the conduit.

The conduit temperature adjusting mechanism may include a user interface and first and second coaxially oriented passageways formed along an entire longitudinal length of the conduit. The first and second coaxially oriented passageways may preferably be used for separately channeling first and second water streams from the reservoir to the egress spout respectively.

Further, a plurality of first and second valves may preferably be pivotally coupled to opposed ends of the first and second passageways by a first and second hinges such that the first and second pluralities of valves may be electrically coupled to the user interface and preferably may be responsive to instruction signals transmitted from the user interface. Each of the first and second pluralities of valves may further be independently articulated along a corresponding arcuate path and thus permit the first and second water streams to independently travel along the first and second passageways respectively.

In one embodiment, the conduit temperature adjusting mechanism may further include a plurality of cooling elements nested between inner and outer diameters of the first passageway and a plurality of heating elements nested between inner and outer diameters of the second passageway.

In addition, the heating and cooling elements may further be electrically coupled to the user interface and may further be toggled between on and off modes upon receiving the instruction signals from the user interface. The conduit temperature adjusting mechanism may further include a first and second insulating layers concentrically wrapped about the first and second passageways for assisting to maintain the first and second passageways at a desired temperature level. Such an insulation may preferably have the advantage of preventing heat transfer between the first and second passageways and vice versa.

In another embodiment, the first passageway may preferably remain isolated from the second passageway such that water is prohibited from entering the first passageway while the first plurality of valves is closed. Similarly, the second passageway may remain isolated from the first passageway such that water is prohibited from entering the second passageway while the second plurality of valves is closed. In addition, the first and second passageways may preferably be isolated from the reservoir and the egress spout when the first and second plurality of valves is biased to the closed position respectively.

Such a conduit temperature adjusting mechanism may preferably provide a compact and integrated water dispensing system adaptable to the confined spaces within the vehicle.

The invention may include a method of utilizing an automobile water dispensing system for providing users with a readily available source of drinking water while traveling. The method may preferably comprise the chronological steps of firstly providing a reservoir adapted to house a predetermined quantity of water; placing the reservoir within a trunk of the automobile; providing and directly connecting a thermodynamic conduit to the reservoir; directing the conduit to a passenger section of the automobile; and further providing and fluidly communicating an egress spout with the conduit.

The method may further include the chronological steps of locating the egress spout underneath a dashboard of the automobile; providing and coupling a pump to the reservoir for maintaining a minimum pressure level such that water freely flows through the conduit and exits from the egress spout upon receiving a user input at the egress spout. Further the conduit temperature adjusting mechanism may selectively adjust a temperature of the conduit such that a corresponding water temperature is adjusted during downstream travel from the reservoir to the egress spout. Additionally, the conduit temperature adjusting mechanism may be disposed exterior of the reservoir wherein the conduit temperature adjusting mechanism is embedded within the conduit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-8 by the reference numeral 10 and is intended to provide a drinking water dispensing system for automobiles and associated method. In a preferred embodiment, the drinking water dispensing system 10 may preferably include a reservoir 20; an egress spout 21, a pump 23; temperature adjusting mechanism 24; a user interface 25; a thermodynamic conduit 30 having a first valve 33 and second valve 34; cooling elements 35; heating elements 36; a first insulating layer 45; and a second 46 insulating layer.

Referring to FIGS. 1-6 in more detail, the automobile water dispensing system 10 may preferably include a reservoir 20 adapted to house a predetermined quantity of water within. The reservoir 20 may preferably be adapted to be placed within a trunk 12 of the automobile 11. As perhaps best shown in FIGS. 3-4, an inlet 90 may be formed along a planar top surface of the reservoir 20. A cap 91 may be pivotally mated to the top surface wherein a rubber plug 92 is form-fitted to snuggly mate with the inlet 90 when the cap 91 is closed. Notably, a thermodynamic conduit 30 may be directly connected to the reservoir 20 such that the conduit 30 is adapted to be directed to a passenger section 13 of the automobile 11.

Figure 1:
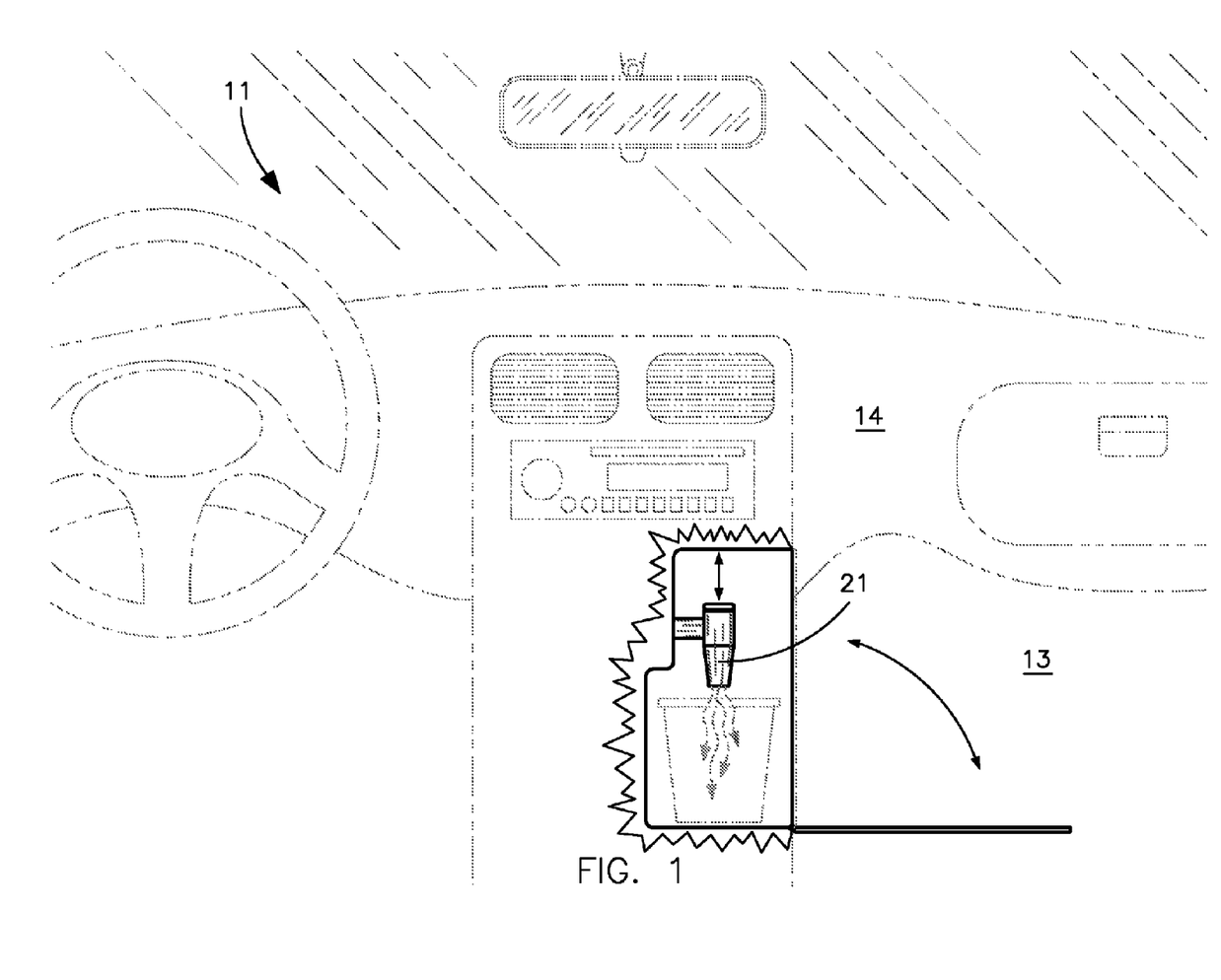
FIG. 1 is a front elevational view showing an egress spout and its location in relation to the dashboard and passenger section of an automobile, in accordance with the present invention.
Figure 2:
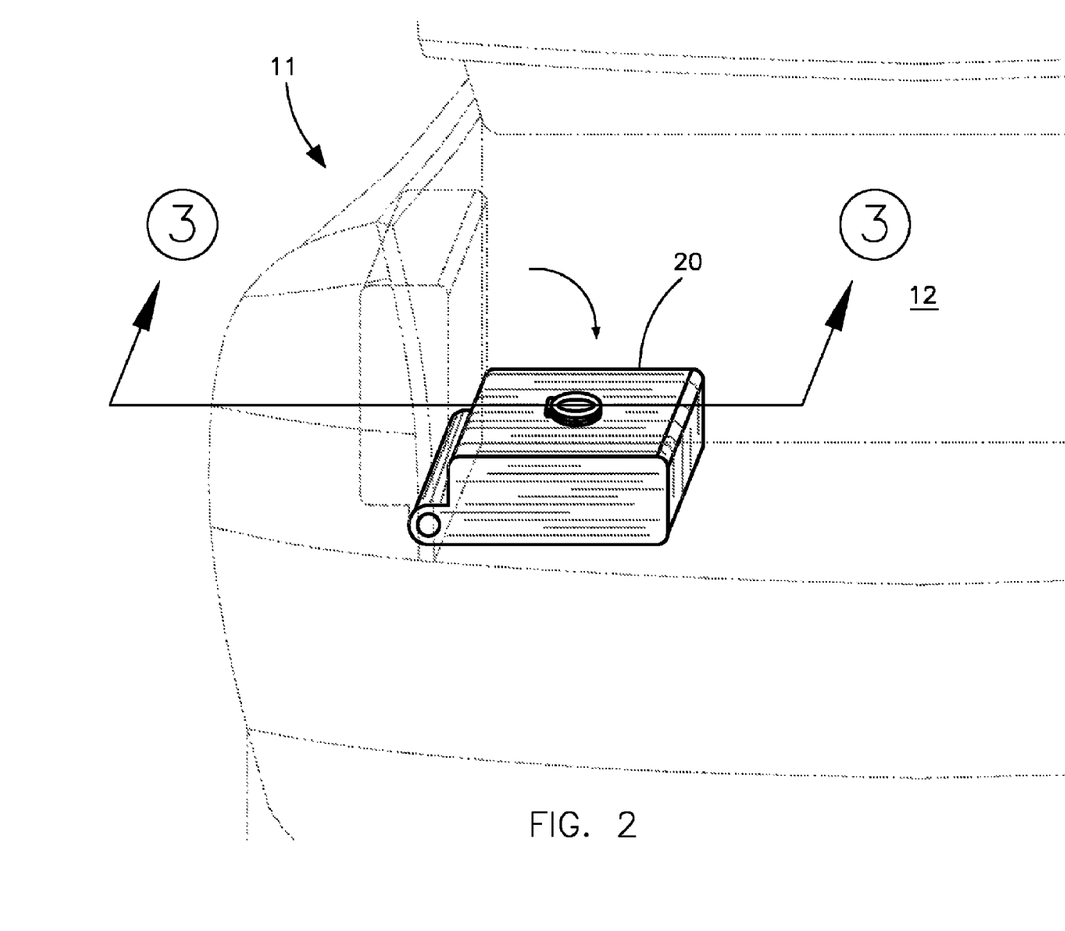
FIG. 2 is a front elevation view showing the reservoir and its location in the trunk of the automobile.
Figure 3:
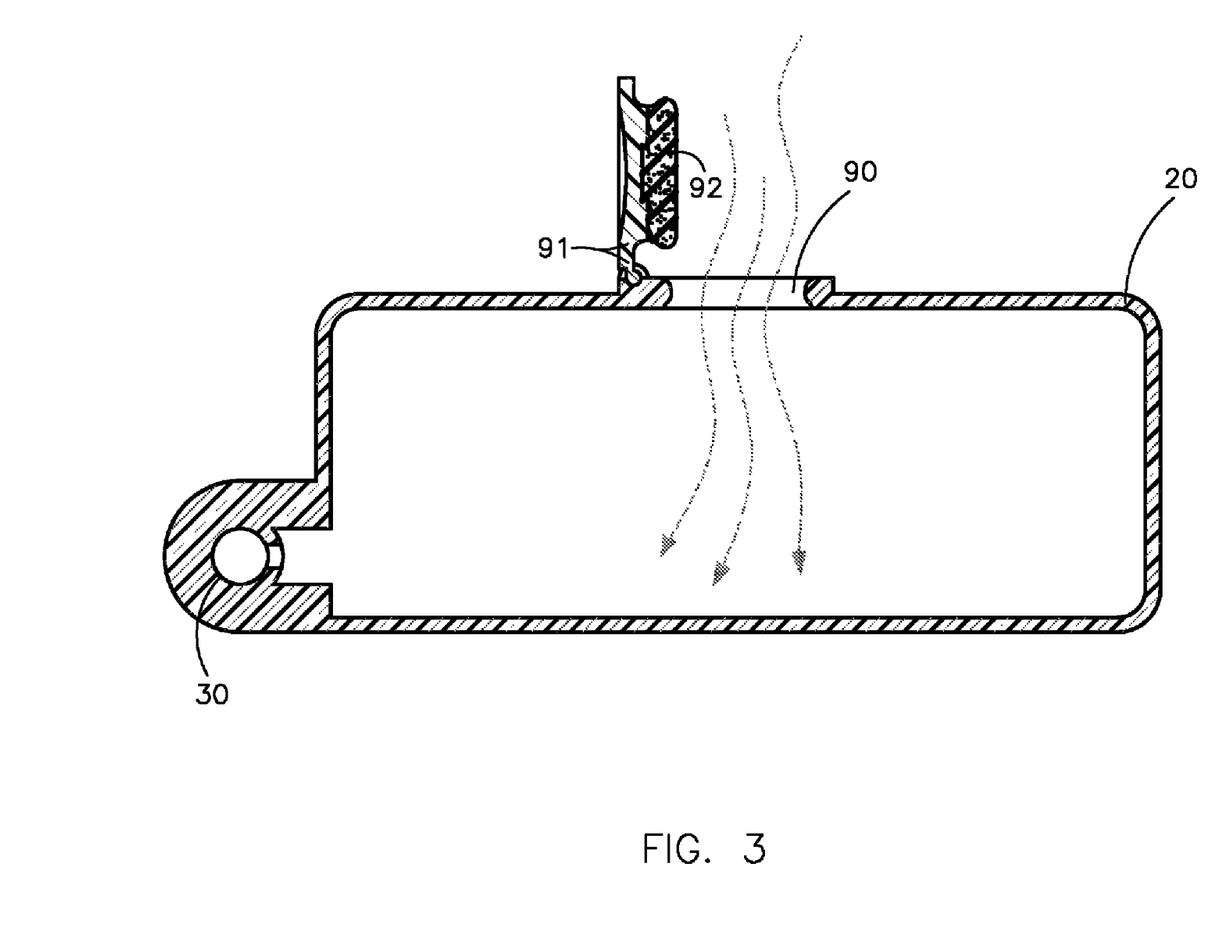
FIG. 3 is a side cross-sectional view showing the reservoir with open cap for filling water as shown in FIG. 2.
Figure 4:
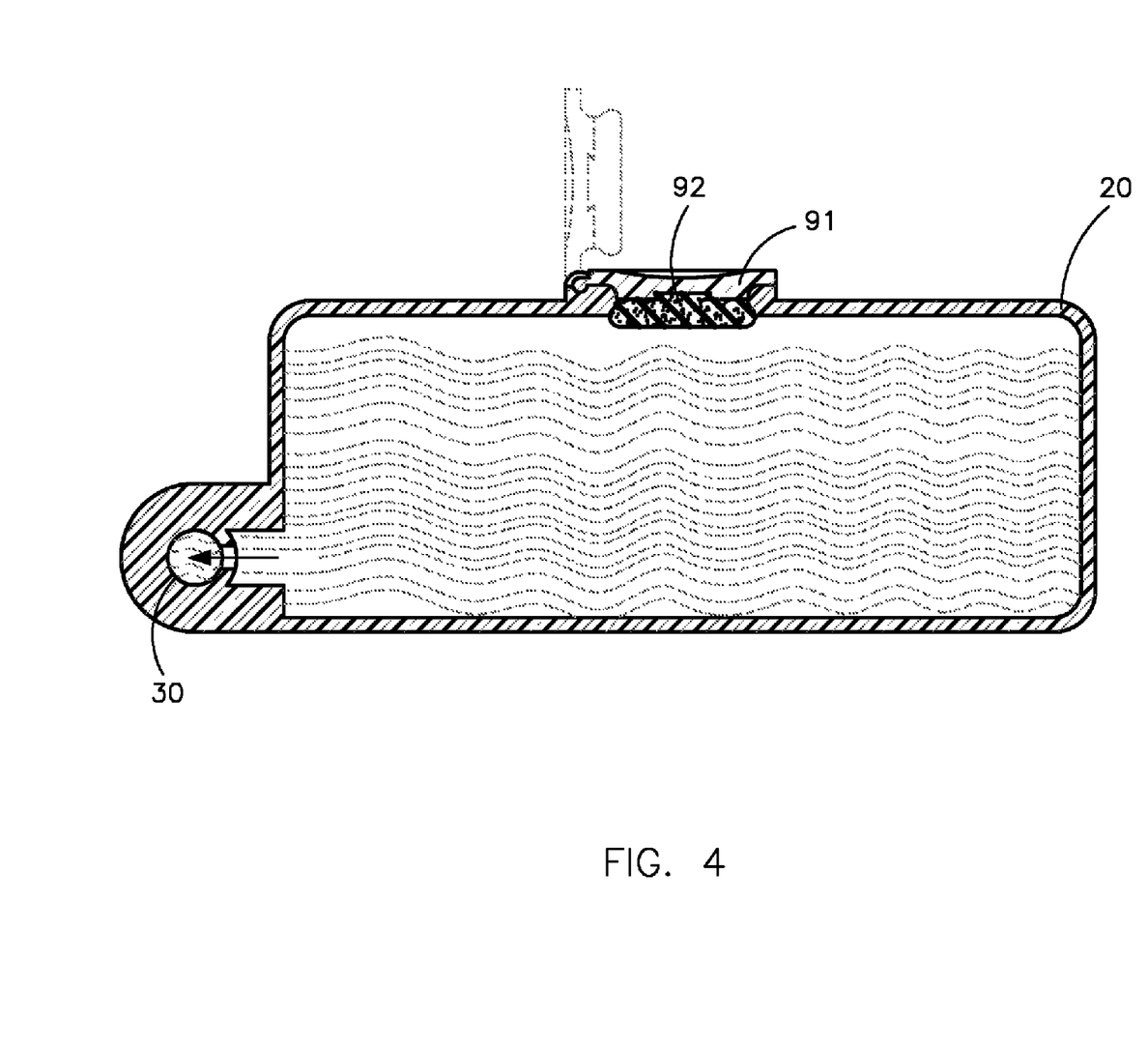
FIG. 4 is cross-sectional view showing the reservoir with closed cap filled with water as shown to FIG. 2.
Figure 8:
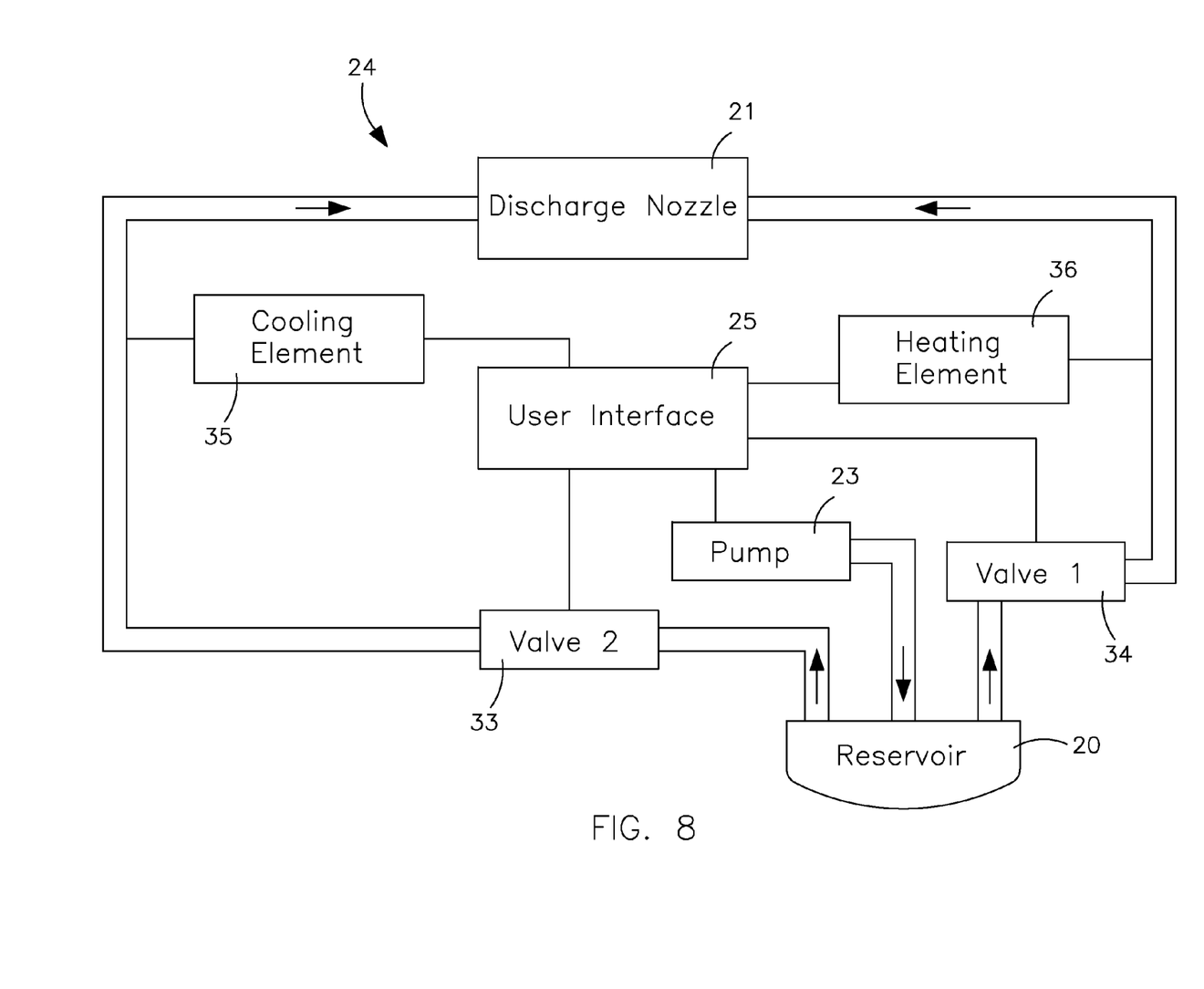
FIG. 8 is a schematic block diagram showing the different elements of the temperature adjusting mechanism.

As shown in FIG. 1 and FIG. 2, an egress spout 21, in fluid communication with the conduit 30, may preferably be adapted to be located underneath a dashboard 14 of the automobile 11. Referring to FIG. 8, a pump 23, operably coupled to the reservoir 20, may preferably maintain a minimum pressure level such that water may freely flow through the conduit 30 and exit from the egress spout 21 upon receiving a user input at the egress spout 21.

A conduit temperature adjusting mechanism 24 may preferably be adapted for selectively adjusting a temperature of the conduit 30 such that a corresponding water temperature is adjusted during downstream travel from the reservoir 20 to the egress spout 21. The conduit temperature adjusting mechanism 24 may preferably be disposed exterior of the reservoir 20 and embedded within the conduit 30, as perhaps best shown in FIG. 5.

Referring back to FIG. 8, the conduit temperature adjusting mechanism 24 may include a user interface 25 for allowing a user to select either hot or cold water, for example. A first passage way 31 and a second passageway 32 are coaxially oriented formed along an entire longitudinal length of the conduit 30. The coaxially oriented first and second passageways 31, 32 may be used for separately channeling first and second water streams from the reservoir 20 to the egress spout 21, respectively.

Figures 5, 6:
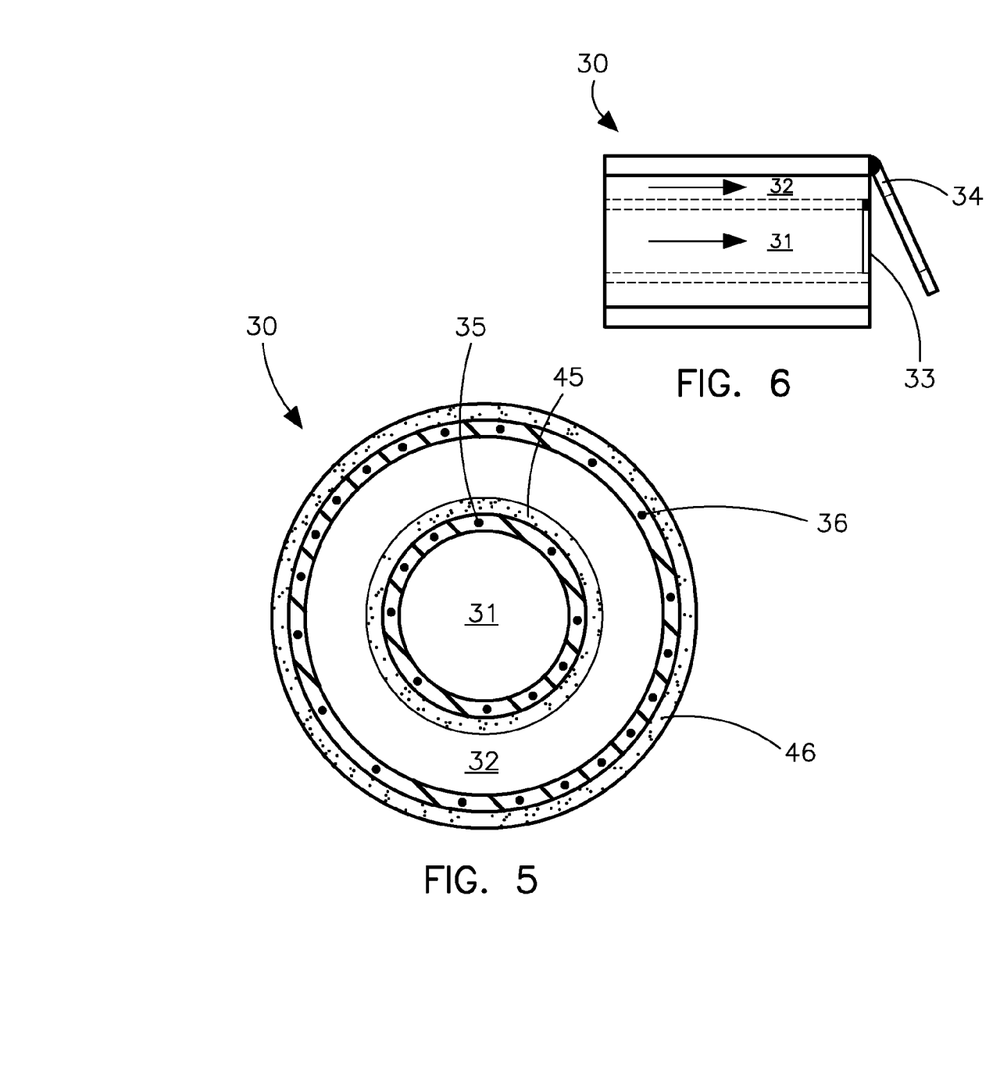
FIG. 5 is a cross-sectional view of the conduit showing the various elements of the conduit.
FIG. 6 is a side elevational view of the conduit showing the valves in relation to the flow of fluid in the conduit.
Figure 7:
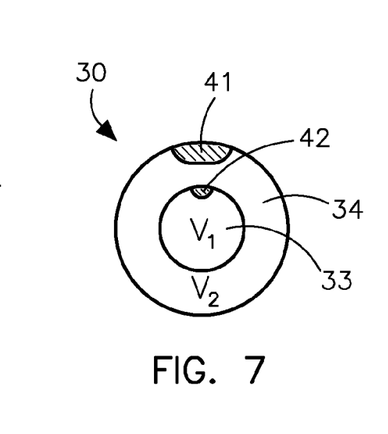
FIG. 7 is a rear elevational view showing the valves and hinges in relation to the conduit as shown in FIG. 6.

Referring further to FIG. 6 and FIG. 7, a plurality of a first valves 33 and second valves 34 may be pivotally coupled by way of a first hinge 41 and second hinge 42 to opposed ends of the first passageway 31 and second passageway 32, respectively. Such first and second pluralities of valves 33, 34 may be electrically coupled to the user interface 25 and preferably may be responsive to instruction signals transmitted from the user interface 25. In this manner, a user is able to selectively bias each valve between open and closed positions when he/she needs hot/cold water.

Each of the first and second pluralities of valves 33, 34 may further be independently articulated along a corresponding arcuate path and thus permit the first and second water streams to independently travel along the first passageway 31 and second passageway 32, respectively.

Referring to FIG. 5 and FIG. 8, the conduit temperature adjusting mechanism 24 may further include a plurality of cooling elements 35 nested between an inner and outer diameter of the first passageway 31. Such cooling elements 35 reduce the water temperate and the first water stream passes through the first passageway 31. Exemplary cooling elements 35 may include, for example, thermoelectric coolers such as liquid heat exchangers sold at www.customthermoelectric.com. The thermoelectric coolers may be in fluid communication with the first water stream flowing through the first passageway 31 such that heat is removed from the first water stream as it travels through the first passageway 31 and interacts with the cooling elements 35. In this manner, cold water is discharged from the egress spout 21 by opening the first valves 33, while the second valves 34 remain closed.

In addition, a plurality of heating elements 36 are preferably nested between an inner and outer diameter of the second passageway 32. Such heating element 36 and cooling elements 35 may further be electrically coupled to the user interface 25 and may preferably be toggled between on and off modes upon receiving the instruction signals from the user interface 25.

Exemplary heating elements 36 may include, for example, Nichrome 80/20 (80% nickel, 20% chromium) wire, ribbon, or strip. Nichrome 80/20 is an ideal material, because it has relatively high resistance and forms an adherent layer of chromium oxide when it is heated for the first time. Material beneath the wire will not oxidize, preventing the wire from breaking or burning out.

Another suitable heating element may include resistance wire such as ribbon, straight or coiled resistance wire. For example, Kanthal (FeCrAl) wires and Cupronickel (CuNi) alloy wire for low temperature heating may be employed by the present invention.

In this manner, hot water is discharged from the egress spout 21 by opening the second valves 34, while the first valves 33 remain closed.

In addition, the conduit 30 may preferably include a first insulating layer 45 and a second insulating layer 46 concentrically wrapped about the first passageway 31 and the second passageway 32 for assisting to maintain the first and second passageways 31, 32 at a desired temperature level. Such insulation preferably prevents heat transfer between the first and second passageways 31, 32 and vice versa.

Referring to FIG. 6, the first passageway 31 may preferably remain isolated from the second passageway 32 such that water is prohibited from entering the first passageway 31 while the first plurality of valves 33 is closed. Similarly, the second passageway 32 may remain isolated from the first passageway 31 such that water is prohibited from entering the second passageway 32 while the second plurality of valves 34 is closed. In addition, the first and second passageways 31, 32 may preferably be isolated from the reservoir 20 and the egress spout 21 when the first and second plurality of valves 33, 34 is biased to the closed position respectively.

By employing a single conduit 30 having coaxially oriented passageways 31, 32 that are configured to maximize heat transfer loss (for cold water) and minimize heat transfer loss (for hot water), the present invention provides a compact and integrated water dispensing system 10 adaptable to the confined spaces within the vehicle.

The invention may further include a method of utilizing an automobile water dispensing system 10 for providing users with a readily available source of drinking water while traveling. The method may preferably includes the chronological steps of: providing a reservoir 20 adapted to house a predetermined quantity of water; placing the reservoir 20 within a trunk 12 of the automobile 11; providing and directly connecting a thermodynamic conduit 30 to the reservoir 20; directing the conduit 30 to a passenger section 13 of the automobile 11; and providing and fluidly communicating an egress spout 21 with the conduit 30.

The method may in addition include the chronological steps of: locating the egress spout 21 underneath a dashboard 14 of the automobile 11; providing and coupling a pump 23 to the reservoir 20 for maintaining a minimum pressure level such that water freely flows through the conduit 30 and exits from the egress spout 21 upon receiving a user input at the egress spout 21.

The method may further include the chronological steps of: providing a conduit temperature adjusting mechanism 24 for selectively adjusting a temperature of the conduit 30 such that a corresponding water temperature is adjusted during downstream travel from the reservoir 20 to the egress spout 21. The conduit temperature adjusting mechanism 24 may further be disposed exterior of the reservoir 20 wherein the conduit temperature adjusting mechanism 24 is embedded within the conduit 30.

The present invention, as claimed, provides the unexpected and unpredictable benefit of allowing a user with a convenient and ready source of clean, fresh, hot or cold water during long trips in his automobile 11. By utilizing a single conduit having coaxially oriented first and second passageways 31, 32, water is efficiently transferred downstream from the reservoir to the egress spout 21, without requiring two separate conduits for separately transferring hot and cold water, respectively. The combination of such first and second coaxial passageways 31, 32 with the separate heating and cooling elements overcomes prior art shortcomings related to fitting two separate conduits through space-limited areas of the automobile 11. Accordingly, such a claimed invention provides an unpredictable and unexpected result which is not rendered obvious by one skilled in the art.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An automobile water dispensing system for providing users with a readily available source of drinking water while traveling, said automobile water dispensing system comprising:
   a reservoir adapted to house a predetermined quantity of water therein, said reservoir being adapted to be placed within a trunk of the automobile;
   a thermodynamic conduit directly connected to said reservoir wherein said conduit is adapted to be directed to a passenger section of the automobile;
   an egress spout in fluid communication with said conduit, said egress spout being adapted to be located underneath a dashboard of the automobile;
   a pump coupled to said reservoir for maintaining a minimum pressure level therein so that water freely flows through said conduit and exits from said egress spout upon receiving a user input at said egress spout; and
   selectively adjusting a temperature of said conduit such that a corresponding water temperature is adjusted during downstream travel from said reservoir to said egress spout;
   wherein said conduit temperature adjusting means comprises:
   a user interface;
   first and second coaxially oriented passageways formed along an entire longitudinal length of said conduit for separately channeling first and second water streams from said reservoir to said egress spout respectively; and
   a plurality of first and second valves pivotally coupled to opposed ends of said first and second passageways respectively, said first and second pluralities of valves being electrically coupled to said user interface and thereby being responsive to instruction signals transmitted from said user interface;
   wherein each of said first and second pluralities of valves are independently articulated along a corresponding arcuate path and thereby permit the first and second water streams to independently travel along said first and second passageways respectively.

2. The automobile water dispensing system of claim 1, wherein said selectively adjusting a temperature further comprises:
   a plurality of cooling elements nested between inner and outer diameters of said first passageway; and
   a plurality of heating elements nested between inner and outer diameters of said second passageway;
   wherein said heating and cooling elements are electrically coupled to said user interface and are thereby toggled between on and off modes upon receiving the instruction signals from said user interface.

3. The automobile water dispensing system of claim 2, wherein said selectively adjusting a temperature further comprises:
   first and second insulating layers concentrically wrapped about said first and second passageways for assisting to maintain said first and second passageways at a desired temperature level.

4. The automobile water dispensing system of claim 2, wherein said first passageway remains isolated from said second passageway such that water is prohibited from entering said first passageway while said first plurality of valves are closed.

5. The automobile water dispensing system of claim 2, wherein said second passageway remains isolated from said first passageway such that water is prohibited from entering said second passageway while said second plurality of valves are closed.

6. The automobile water dispensing system of claim 2, wherein said first and second passageways are isolated from said reservoir and said egress spout when said first and second plurality of valves are biased to the closed position respectively.

7. An automobile water dispensing system for providing users with a readily available source of drinking water while traveling, said automobile water dispensing system comprising:
   a reservoir adapted to house a predetermined quantity of water therein, said reservoir being adapted to be placed within a trunk of the automobile;
   a thermodynamic conduit directly connected to said reservoir wherein said conduit is adapted to be directed to a passenger section of the automobile;
   an egress spout in fluid communication with said conduit, said egress spout being adapted to be located underneath a dashboard of the automobile;
   a pump coupled to said reservoir for maintaining a minimum pressure level therein so that water freely flows through said conduit and exits from said egress spout upon receiving a user input at said egress spout; and
   selectively adjusting a temperature of said conduit such that a corresponding water temperature is adjusted during downstream travel from said reservoir to said egress spout;
   wherein said conduit temperature adjusting means is disposed exterior of said reservoir and embedded within said conduit;
   wherein said conduit temperature adjusting means comprises:
   a user interface;
   first and second coaxially oriented passageways formed along an entire longitudinal length of said conduit for separately channeling first and second water streams from said reservoir to said egress spout respectively; and
   a plurality of first and second valves pivotally coupled to opposed ends of said first and second passageways respectively, said first and second pluralities of valves being electrically coupled to said user interface and thereby being responsive to instruction signals transmitted from said user interface;
   wherein each of said first and second pluralities of valves are independently articulated along a corresponding arcuate path and thereby permit the first and second water streams to independently travel along said first and second passageways respectively.

8. The automobile water dispensing system of claim 7, wherein said selectively adjusting a temperature further comprises:
   a plurality of cooling elements nested between inner and outer diameters of said first passageway; and
   a plurality of heating elements nested between inner and outer diameters of said second passageway;
   wherein said heating and cooling elements are electrically coupled to said user interface and are thereby toggled between on and off modes upon receiving the instruction signals from said user interface.

9. The automobile water dispensing system of claim 8, wherein said selectively adjusting a temperature further comprises:
   first and second insulating layers concentrically wrapped about said first and second passageways for assisting to maintain said first and second passageways at a desired temperature level.

10. The automobile water dispensing system of claim 8, wherein said first passageway remains isolated from said second passageway such that water is prohibited from entering said first passageway while said first plurality of valves are closed.

11. The automobile water dispensing system of claim 8, wherein said second passageway remains isolated from said first passageway such that water is prohibited from entering said second passageway while said second plurality of valves are closed.

12. The automobile water dispensing system of claim 8, wherein said first and second passageways are isolated from said reservoir and said egress spout when said first and second plurality of valves are biased to the closed position respectively.

13. A method of utilizing an automobile water dispensing system for providing users with a readily available source of drinking water while traveling, said method comprising the chronological steps of:
   providing a reservoir adapted to house a predetermined quantity of water therein;
   placing said reservoir within a trunk of the automobile;
   providing and directly connecting a thermodynamic conduit to said reservoir;
   directing said conduit to a passenger section of the automobile;
   providing and fluidly communicating an egress spout with said conduit;
   locating said egress spout underneath a dashboard of the automobile;
   providing and coupling a pump to said reservoir for maintaining a minimum pressure level therein so that water freely flows through said conduit and exits from said egress spout upon receiving a user input at said egress spout;
   providing a mechanism for selectively adjusting a temperature of said conduit such that a corresponding water temperature is adjusted during downstream travel from said reservoir to said egress spout; and
   disposing said conduit temperature adjusting mechanism exterior of said reservoir wherein said conduit temperature adjusting mechanism is embedded within said conduit.

\* \* \* \* \*